(12) United States Patent
Jayakrishnan et al.

(10) Patent No.: US 7,564,791 B2
(45) Date of Patent: Jul. 21, 2009

(54) MONITORING PACKET FLOWS

(75) Inventors: Bhaskar Jayakrishnan, Karnataka (IN); Ravindra N. Rathi, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 10/748,702

(22) Filed: Dec. 29, 2003

(65) Prior Publication Data

US 2005/0141429 A1    Jun. 30, 2005

(51) Int. Cl.
*H04L 12/26* (2006.01)
(52) U.S. Cl. .................. 370/236; 370/396; 370/428
(58) Field of Classification Search .............. 370/229, 370/230, 231, 235, 360, 363, 368, 371, 412, 370/374, 377, 378, 381, 384, 389, 400–402, 370/428, 252, 253, 254, 241, 396, 416, 417, 370/237, 386, 232, 236, 242, 248, 373, 403
See application file for complete search history.

(56) References Cited

U.S. PATENT DOCUMENTS

| | | | | | |
|---|---|---|---|---|---|
| 5,802,333 | A | * | 9/1998 | Melvin | 710/316 |
| 6,141,344 | A | * | 10/2000 | DeLong | 370/360 |
| 6,252,849 | B1 | * | 6/2001 | Rom et al. | 370/230 |
| 6,396,841 | B1 | * | 5/2002 | Co et al. | 370/401 |
| 6,600,727 | B1 | * | 7/2003 | Mackay | 370/293 |
| 6,628,613 | B1 | * | 9/2003 | Joung et al. | 370/230 |
| 6,680,910 | B1 | * | 1/2004 | Ni | 370/235 |
| 7,130,271 | B1 | * | 10/2006 | Sekihata | 370/236 |
| 2003/0110339 | A1 | * | 6/2003 | Calvignac et al. | 710/305 |
| 2004/0062257 | A1 | * | 4/2004 | Nguyen | 370/403 |
| 2004/0174890 | A1 | * | 9/2004 | Chen et al. | 370/402 |

* cited by examiner

*Primary Examiner*—Brenda Pham
(74) *Attorney, Agent, or Firm*—Fish & Richardson P.C.

(57) ABSTRACT

A method includes receiving on a first switching device a message from a second switching device that indicates to slow packet transmission to the second switching device.

24 Claims, 8 Drawing Sheets

MONITORING PACKET FLOWS

BACKGROUND

Network switches, routers, and the like are used to distribute information through networks by sending the information in segments such as packets. A packet typically includes a "header" that stores a destination address for routing the packet and a "payload" that stores an information segment being sent through the network. To forward the packet to its intended destination, some network switches include application-specific integrated circuits (ASICs) that receive the packet on a port and send the received packet on another port to route the packet for delivery. As the number of packets being sent on a port increase, the probability increases of the port becoming congested and packets being dropped and not transmitted to their intended destinations.

DESCRIPTION

Figure 1:
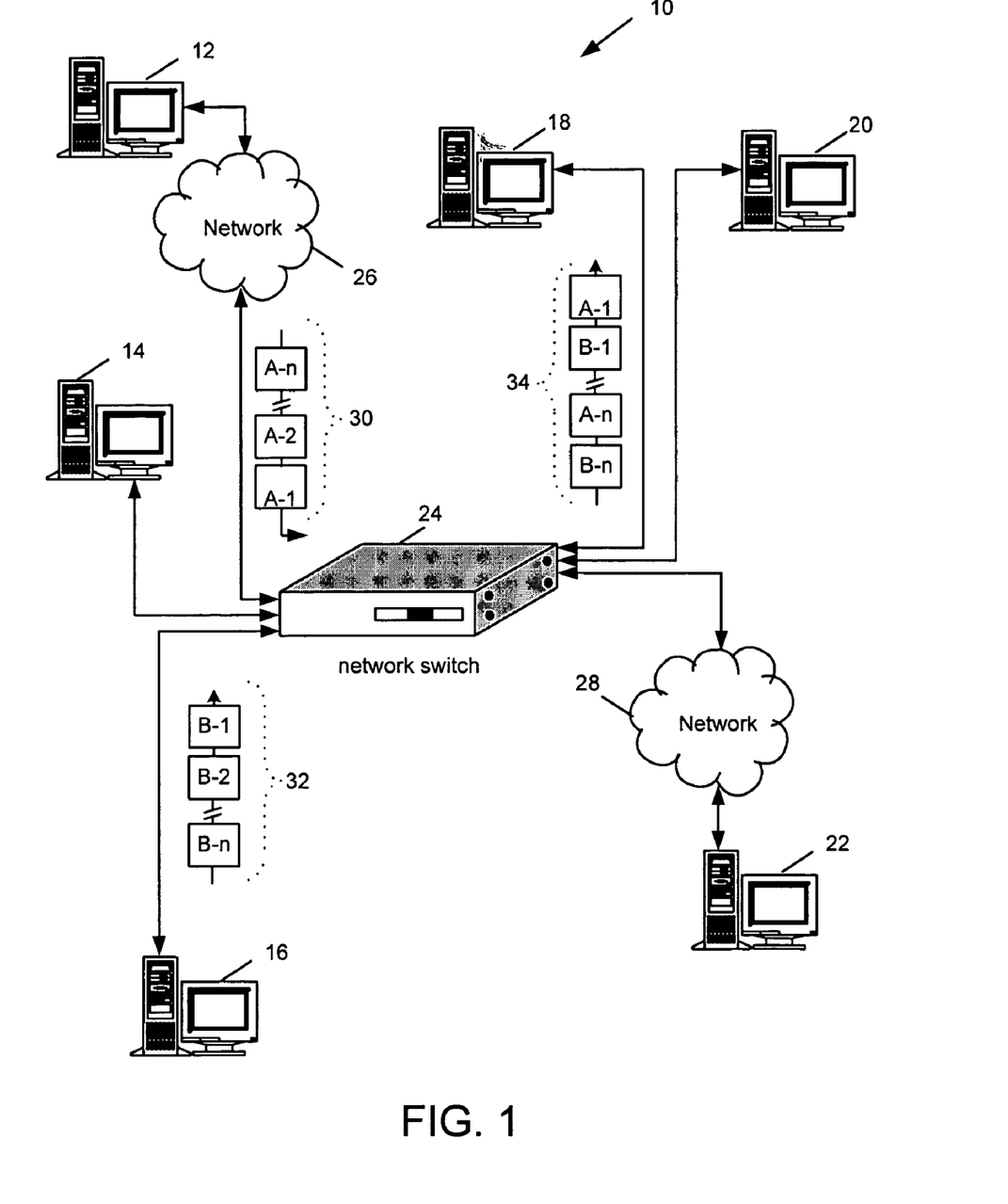
FIG. 1 is a block diagram depicting a system for forwarding packets.

Referring to FIG. 1, a system 10 for transmitting packets among computer systems 12, 14, 16, 18, 20, 22 includes a network switch 24 that directs the packets to their intended destinations. In other arrangements a router or other packet-forwarding device is used individually or in combination to distribute packets among the computer systems. In this particular example, computer systems 12 and 22 connect to the network switch 24 through respective networks 26, 28 (e.g., the Internet, a wide area network (WAN), etc.) while computer systems 14, 16, 18, and 20 are in direct communication with the network switch 24 and form a local area network (LAN). While the system 10 includes networks 26, 28 and the LAN formed by computer systems 14, 16, 18, and 20, in other arrangements, the system 10 may use other networking techniques (e.g., wireless network links, global networks, etc.) for delivering packets.

The network switch 24 directs a stream of packets 30 from computer system 12 to computer system 18. Similarly another stream of packets 32 is directed by the network switch 24 from computer system 16 to computer system 18. In this example, the packet stream 34 passes to computer system 18 and includes the packets of stream 30 interleaved with the packets of stream 32. However, the network switch 24 may use other techniques to combine the packets from the streams 30, 32. The network switch 24 operates with a finite capacity to deliver the packet stream 34 to computer system 18. If the packets being directed exceed the capacity of the network switch 24, packets may be lost and need to be retransmitted from their respective source(s) (e.g., computer system 12, computer system 16, etc.).

Figure 2:
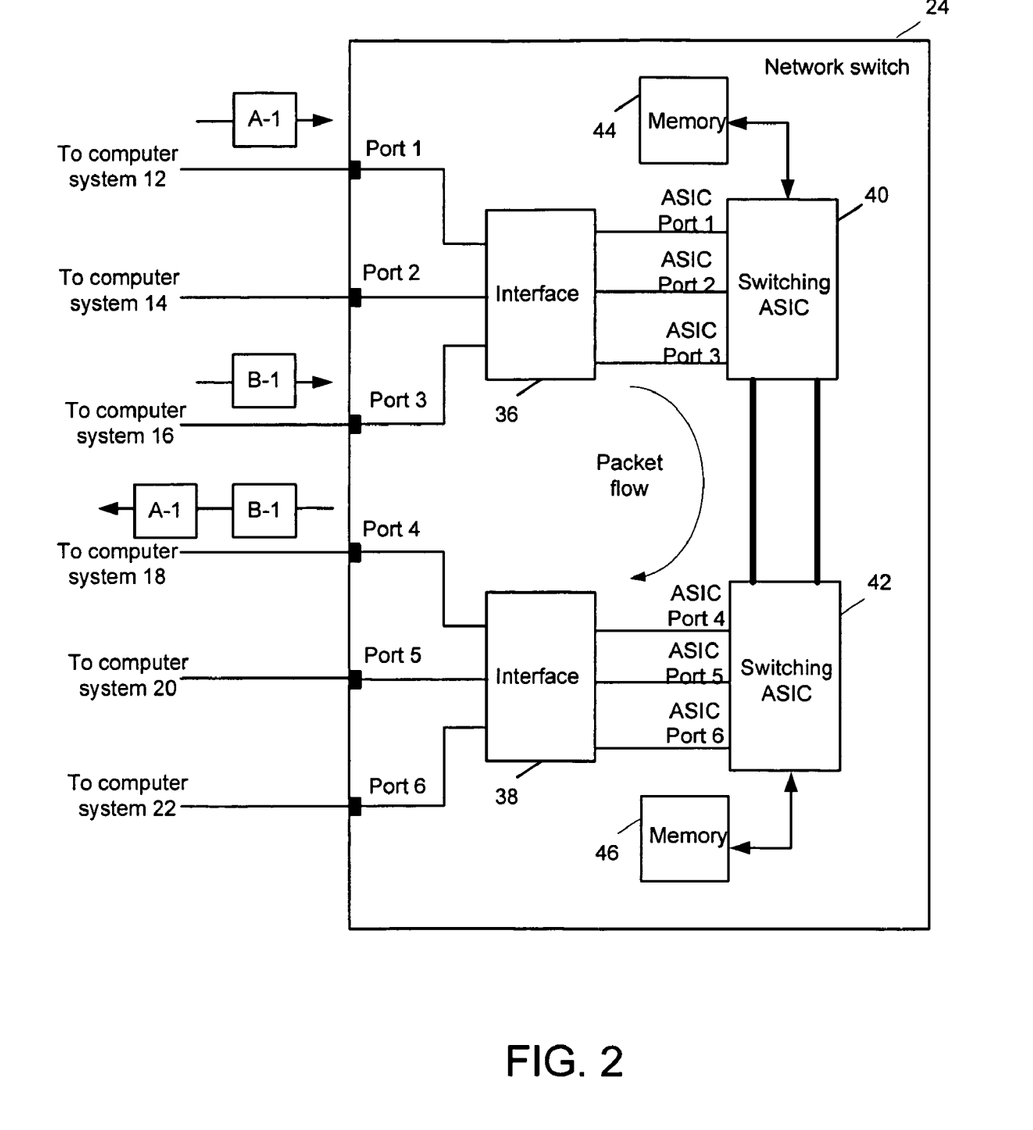
FIG. 2 is a block diagram depicting a network switch.

Referring to FIG. 2, an exemplary design of the network switch 24 includes ports that provide a physical link to the computer systems 14, 16, 18, 20 and the networks 26, 28 along with the capability to receive and transmit packets. For ease of understanding, this example of the network switch 24 has six ports, however, typically a network switch includes ports (e.g. 24 ports, 48 ports, etc.) to support more than six computer systems or other digital devices (e.g., servers, personal digital assistants (PDAs), etc.). Furthermore, in this example each of the six computer systems 12-20 communicate with the network switch 24 on separate ports, however, each port is capable of communicating with two or more computer systems.

Each of the six ports are respectively in communication with one of two interfaces 36, 38 that collect incoming packets from the ports and pass outgoing packets to one or more of the respective ports. In some arrangements, the interfaces 36, 38 include peripheral interface controllers (PIC) for establishing an interface with the devices (e.g., computer systems 14-20, network 26-28, etc.) in communication with the network switch 24.

The network switch 24 also includes two switching ASICs 40, 42, which are integrated circuits provided for directing packets received by the network switch to their intended destination. For example, after receiving packet A-1 on port 1, the packet is passed from the interface 36 to the switching ASIC 40. Based on data stored in the header of packet A-1, the switching ASIC 40 passes the packet to switching ASIC 42 to deliver the packet to computer system 18 through port 4. Similarly packet B-1, received on port 3 from computer system 16 is passed though interface 36 to switching ASIC 40 and is directed to switching ASIC 42 and through interface 38 to deliver to computer system 18 on port 4. While both packets A-1 and B-1 are passed from switching ASIC 40 to switching ASIC 42 to be delivered to computer system 18, packets may also pass in the opposite direction (e.g., from switching ASIC 42 to switching ASIC 40) or in a combination of directions. Also, while the network switch 24 uses switching ASICs 40, 42 to direct packets to intended destinations, in other arrangements other switching devices (e.g., switch fabrics, switch elements, crossbars, etc.) are included in the network switch.

Typically, as the packets are received by one of the ports (e.g., ports 1-3) in communication with interface 36, the packets are stored in a memory 44 (e.g., a random access memory (RAM), a static random access memory SRAM, a dynamic random access memory (DRAM), etc.) in communication with the switching ASIC 40. Similarly, packets received on ports (e.g., ports 4-6) in communication with interface 38 are stored in a memory 46 in communication with switching ASIC 42. By storing the packets in either memory 44, 46 the switching ASICs 40, 42 can respectively access and retrieve one or more stored packets to determine their intended destination or to perform other operations related to the packets.

To forward a received packet, either switching ASIC 40, 42 accesses a packet header and retrieves one or more stored destination addresses and determines if the network switch port or ports needed to transmit the packet are in communication with the ASIC or if the packet needs to be passed to the other switching ASIC to transmit the packet to its intended destination(s). For example if a packet received from computer system 12 on port 1 needs be sent to computer system 14, the switching ASIC 40 determines that the packet can sent on port 2 without passing the packet to switching ASIC 42. Alternatively, either switching ASIC 40, 42 is capable of determining that a packet needs to be passed to the other switching ASIC as shown with packets A-1 and B-1. In some arrangements, if either switching ASIC 40, 42 does not recognize or cannot determine the intended destination of a packet, the packet is transmitted over each port (e.g., ports 1-6) of the network switch.

Figure 3A:
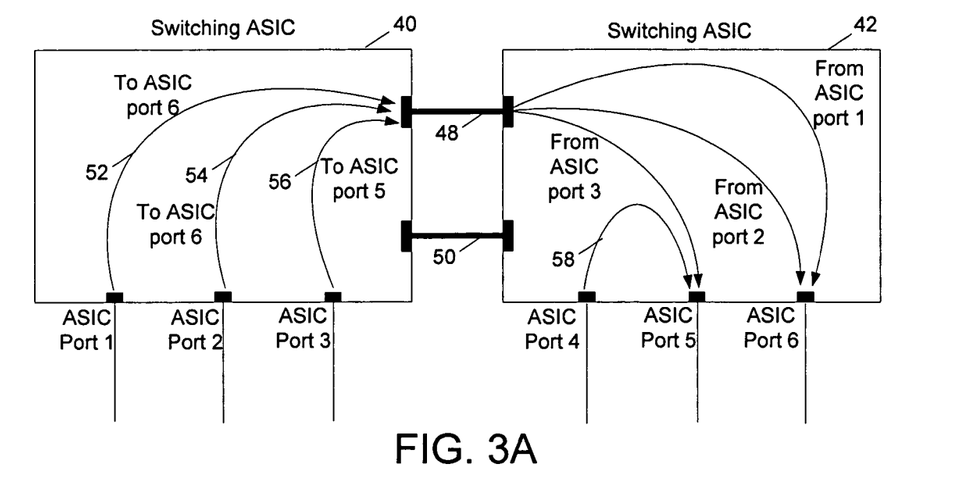
FIGS. 3A-B are block diagrams depicting two application-specific integrated circuits (ASICs).

Referring to FIG. 3A, the switching ASICs 40, 42 are connected by two hardware-implemented links 48, 50 that provide bi-directional packet passing and have relatively high passing capacity. In this particular example, packets are passed over link 48 from switching ASIC 40 to switching ASIC 42 in three packet flows 52-56. Packet flow 52 passes packets from ASIC port 1 of switching ASIC 40 to ASIC port 6 of switching ASIC 42. Similarly packet flow 54 passes packets from ASIC port 2 to ASIC port 6. Along with being passed packets from ASIC port 3 by packet flow 56, ASIC port 5 on switching ASIC 42 receives packets on packet flow 58 from ASIC port 4 that is included in switching ASIC 42.

Packets flows 52, 54, and 56 propagate through link 48, which has the capacity to handle the packet traffic of the three flows. While both of the links 48, 50 are capable of handling such traffic, the individual ASIC ports have a lower capacity for handling relatively large packet traffic. For example, ASIC port 6, which receives packets from flows 52 and 54 has limited buffer space and bandwidth for holding and transmitting the combined packets from the two flows. Similarly, ASIC port 5 receives packets from flows 56, 58, however, packet flow 56 sends packets at a relatively slow rate and ASIC port 5 has sufficient buffer space and bandwidth to transmit the combined packets from both flows to the interface 38.

Since ASIC port 6 lacks the capacity to handle the received packet traffic, the switching ASIC 42 sends a message to the switching ASIC 40 for regulating the packet flows 52, 54 from ASIC ports 1 and 2. To regulate the packet flows 52, 54, based on the message, switching ASIC 40 slows or stops the packet flows from causing the congestion on ASIC port 6. By sending a message to stop the port congestion, packet transmission efficiency increases along with efficient use of port bandwidth. Furthermore, during some time periods the packet flows include groups of packets known as "bursts". By regulating the packet flows being received from other switching ASICs, the network switch 24 or other packet-forwarding device improves response times for handling packet bursts so that less packets are dropped and packet re-transmissions are reduced.

Figure 3B:
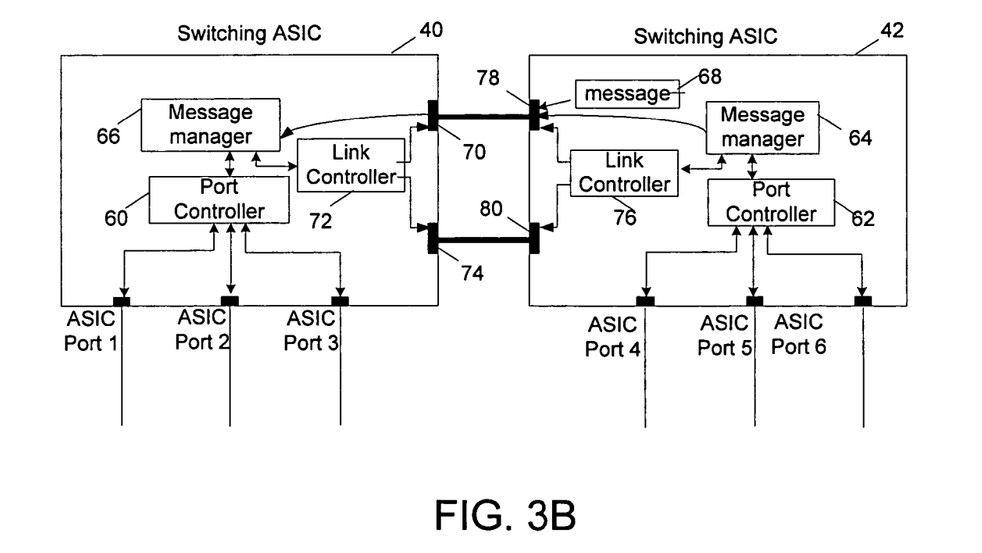

Referring to FIG. 3B, each switching ASIC 40, 42 includes respective port controllers 60, 62 that detect if one or more of the ASIC ports included in the respective switching ASIC is congested by packet traffic that originates at either switching ASIC. As shown in FIG. 3A, ASIC port 6 of the switching ASIC 42 is congested by packet flows 52, 54 and the port controller 62 detects the congestion and signals a message manager 64 included in the switching ASIC 42. Similarly switching ASIC 40 also includes a message manager 66 that receives a signal from the port controller 60 if on or more of the ASIC ports 1-3 becomes congested.

Along with detecting congestion, the port controllers 60, 62 also regulate packet flow that arrives on the respectively associated ASIC ports. For example, if ASIC port 5 is congested by packet flow 58, which is from the switching ASIC 42, and the port controller 62 detects the congestion on port 5 and signals ASIC port 4 to reduce or stop the packet flow 58 to ASIC port 5. Similarly, the port controller 60 included in switching ASIC 40 is capable of detecting congestion and communicating with ASIC ports on the switching ASIC 40 to regulate packet flow.

If one or more of the ASIC ports are congested by packets flows from the other switching ASIC, the port controllers 60, 62 also detect the congestion on the respective ASIC ports and signal the respective message managers 64, 66. After being notified that a port is being congested by one or more packet flows from the other switching ASIC, the respective message manager 64, 66 produces a message that includes information identifying the congested port and sends the message to the other switching ASIC. Typically, the message is sent over the same high capacity link that the congesting packet flow is being received over. For example, since link 48 is providing the congesting packet flows 52, 54, the message manager 64 sends a message 68 that identifies congested ASIC port 6 over the same link 48 to switching ASIC 40. Similarly, if port controller 60 detects that one or more packet flows from switching ASIC 42 are congesting an ASIC port (e.g., ASIC port 1) on switching ASIC 40, the message manager 66 sends a message through the same link or links from which the congesting packet flows are being received.

After receiving the message 68 over link 48, the message manager 66 notifies the port controller 60 to slow or stop the transmission of packet flows intended for congested ASIC port 6. In this example, the port controller 60 stops the packet flows 52, 54 entering through respective ASIC ports 1 and 2. Also, in some arrangements, message manager 66 produces messages to slow or stop the transmission of packet flows to or from devices connected to the ASIC 40. For example, message manager 66 may produce messages to slow packet flows to or from computer systems 12 and 14 respectively connected to ports 1 and 2.

Prior to the packet flows 52, 54 being stopped, packets may have been already sent from ASIC ports 1 and 2 to a link port 70 to be stored and prepared for transmission over link 48. To stop the transmission of packets to congested ASIC port 6, which are already present on the link port 70, the message manager 66 signals a link controller 72 to stop the transmission of any packets in the link port intended for congested ASIC port 6. In response to the signal, the link controller 72 accesses the link port 70 to stop the transmission of such packets. Similarly, the link controller 72, for example, accesses a link port 74, which is associated with high capacity link 50, to stop packet intended for ASIC port 6 from being transmitted over the link 50. Switching ASIC 42 also includes a link controller 76 for regulating (e.g., stopping) the flow of packets through link ports 78, 80 associated with the high capacity links 48, 50.

In this example the port controllers 60, 62, the message managers 64, 66, and the link controllers 72, 76 are respectively hardware-implemented in the switching ASICs 40, 42. However, in other arrangements the operations of the port controllers 60, 62, message managers 72, 76, and link controllers 72, 76 are performed individually or in combination by a processor (e.g., a microprocessor, etc.) that executes instructions stored in a memory (e.g., RAM, SRAM, DRAM, read only memory (ROM), etc.) or a storage device (e.g., hard drive, CD-COM, etc.) that is in communication with the processor.

Figure 4:
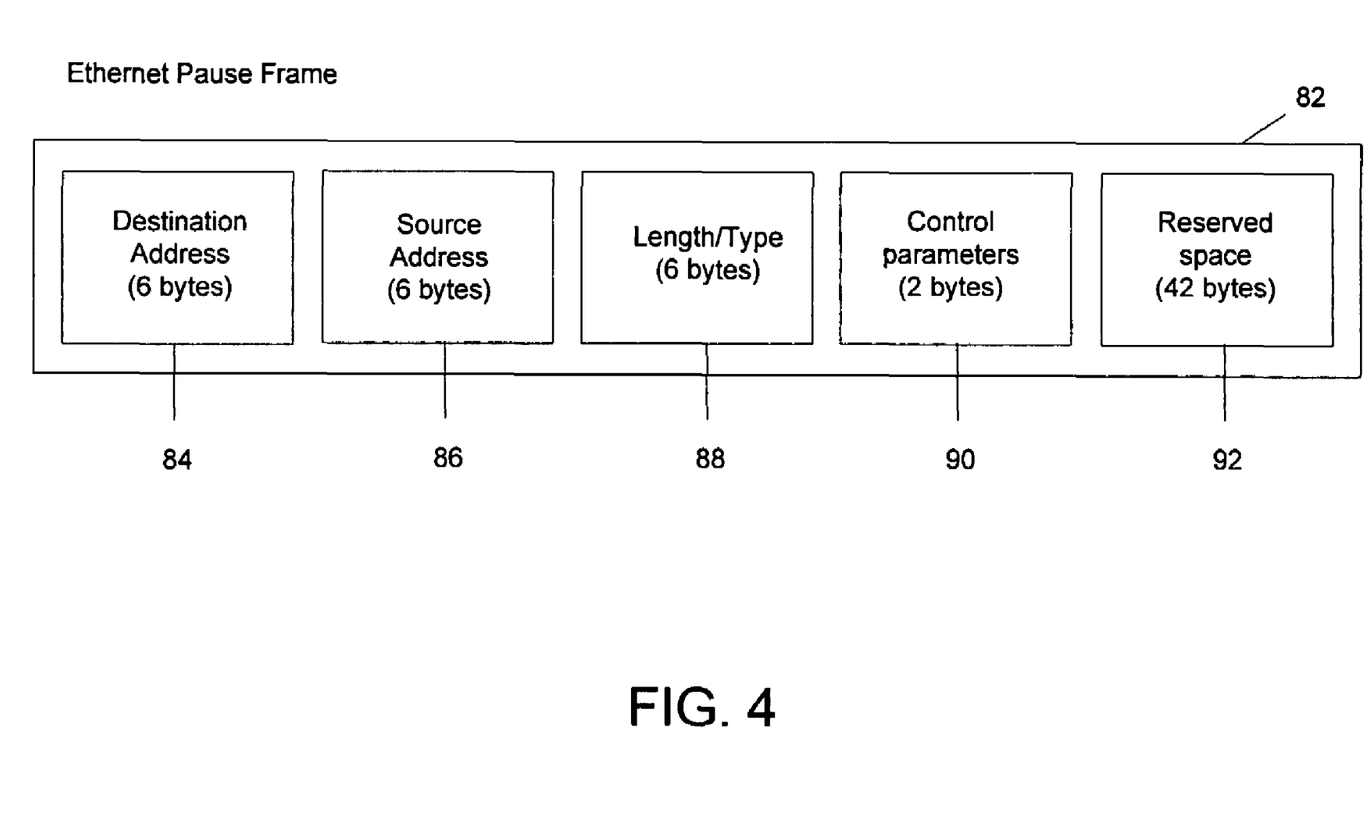
FIG. 4 is a block diagram depicting an Ethernet pause frame.

Referring to FIG. 4, in some arrangements the message 68 sent by message manager 64 is an Ethernet pause frame 82 that informs the switching ASIC 40 that one or more ASIC ports (e.g., ASIC port 6) on switching ASIC 42 are congested. In general, the Ethernet pause frame 82 permits one switching ASIC to temporarily stop traffic from another switching ASIC. Typically, the Ethernet pause frame 82 causes a switching ASIC to suspend packet transmission to a congested port until a specified time period has elapsed or if another message is received that reports congestion has been resolved and packet transmission can be resumed.

In this example, the Ethernet pause frame 82 includes a destination address segment 84 that identifies, for example, the switching ASIC 40 being sent the pause frame or other connected (e.g., by high capacity link 48) endpoints. Although, in some arrangements the destination address segment 84 stores data for broadcasting the Ethernet pause frame 82 to multiple switching ASICs or other destinations. The Ethernet pause frame 82 also includes a source address segment 86 that includes data (e.g., an address) that identifies the source of the pause frame such as the switching ASIC 42.

To identify that the Ethernet pause frame 82 is storing information related to packet flow control and not packet flow data, a length/type segment 88 included in the pause frame identifies the frame type (e.g., control frame, data frame, etc.) along with the length of the frame. The Ethernet pause frame 82 also includes a control parameter segment 90 that stores, for example, a 16-bit value that specifies the time duration to pause packet transmission in units of 512-bit time increments. In some arrangements, if another Ethernet pause frame is received prior to the expiring of the current pause time period provided by the 16-bit value, the time-out period provided by the later arriving pause frame replaces the period provided by the former Ethernet pause frame. In other scenarios, if another Ethernet pause frame, or other type of control frame is received prior to the expiring of the current pause time, the pause period is ended and packet transmission resumes.

To provide the switching ASIC 40 that receives the Ethernet pause frame 82 with the one or more ports that are congested on the switching ASIC 42, the pause frame stores data in reserved space 92 that identifies the congested ASIC ports. For example, the reserved space 92 stores a binary number that identifies ASIC port 6 as being congested. Additionally, in other arrangements the reserved space 92 stores other information associated with ASIC port congestion individually or in combination with the identity of the congested ASIC port 6. In some arrangements, a portion of the reserved space 92 stores data that identifies the source of the ASIC port congestion. For example, binary numbers identifying ASIC ports 1 and 2 on switching ASIC 40 are included in the reserve space 92 so that message manager 66 is informed which particular ASIC ports need to stop transmitting packets for the pause time period. In still another example, the reserved space 92 stores binary numbers that identify the particular packet flows that need to stop packet transmission to alleviate port congestion. For example, unique binary numbers identifying packet flows 52 and 54 are stored in the reserved space 92. Furthermore, in some arrangements these identification techniques are used in combination to relieve congestion on the ASIC ports.

Figure 5:
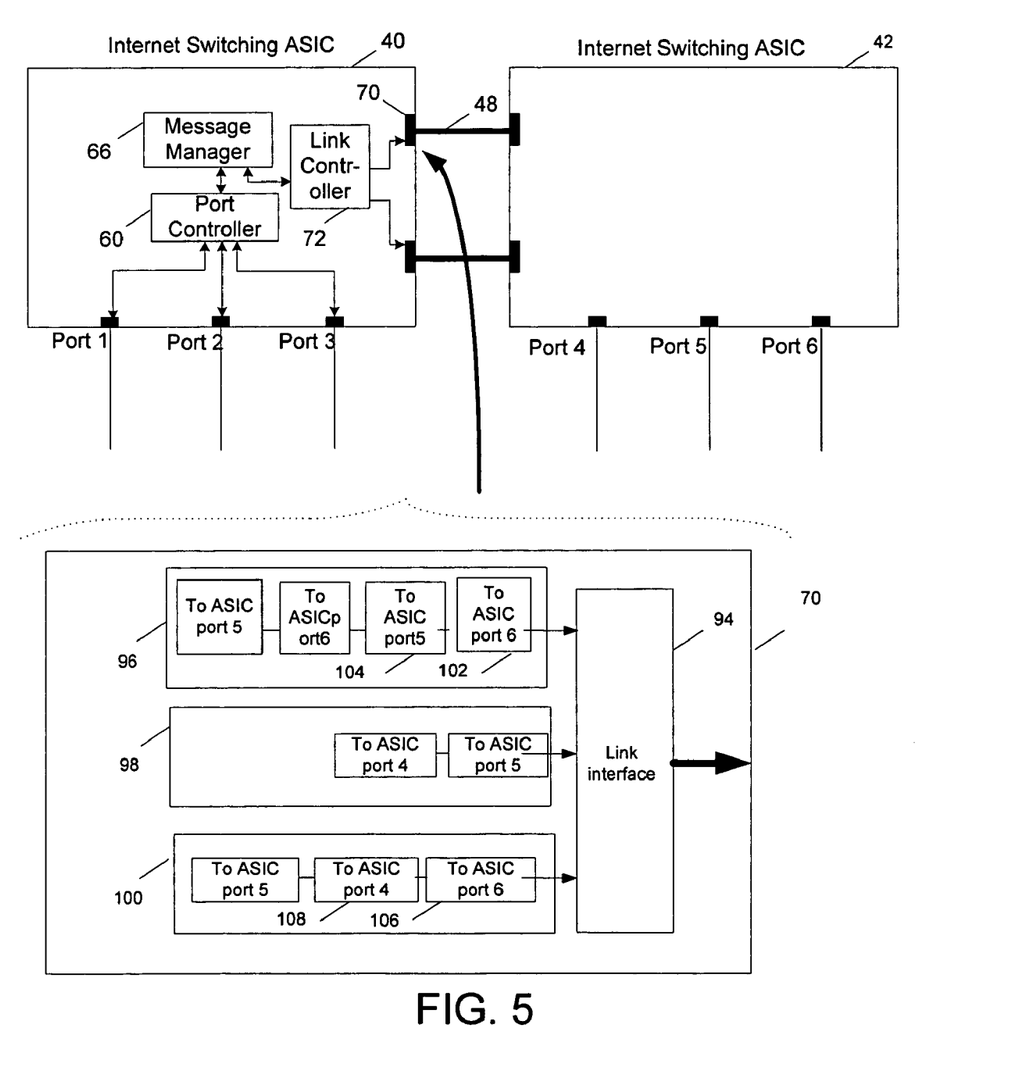
FIG. 5 is a block diagram depicting two ASICs and a high capacity link port.

Referring to FIG. 5, after the message 68 (e.g., Ethernet pause frame) is received by the message manager 66 on the switching ASIC 40, the message manager signals the link controller 72 that packets are not to be passed through link port 70 to ASIC port 6 on the switching ASIC 42. The link port 70 includes a link interface 94 that selects packets from, for example, a series of three queues 96, 98, 100 that receive packet from the packet flows 52, 54, 56 for transmission across the high capacity link 48. Typically the link interface 94 selects the packets from the queues based on a scheduling scheme such as weighted round robin (WRR) scheduling, weighted fair queuing (WFQ), strict priority, or another scheduling scheme. However, based on the congestion information provided by message 68, the link controller 72 also influences which packets are selected by the link interface 94 for transmission.

Each of the three queues 96, 98, 10 typically stores packets that each identify the particular ASIC port(s) that are intended destinations. For example queue 96 stores packets respectively destined for ASIC ports 5 and 6 on the switching ASIC 42. Similarly queues 98 and 100 store packets to be delivered to ASIC ports 4, 5, and 6.

Since the message 68 informed the message manager 66 that ASIC port 6 is congested, the link controller 72 checks the packets stored in the queues 96, 98, 100 to determine if one or more are intended to be sent to ASIC port 6. To check the queued packets, the link controller 72 accesses each packet that is ready to be selected by the link interface 94 for transmission across the high capacity link 48. If the link controller 72 determines a packet is intended for congested ASIC port 6, the packet is held in the associated queue and not allowed to be selected based on the scheduling scheme used by the link interface 94. For example, since packet 102 is intended for ASIC port 6, it is held in queue 96 and packet 104, which is intended for ASIC port 5, is the next selectable packet from queue 96. Similarly, packet 106 stored in queue 100 is held and the next packet 108 is provided for selection since it is not intended for delivery to the congested ASIC port 6.

By holding the packets intended for congested ASIC port 6 in the queues 96, 98, 100, the link interface 94 selects packets destined for un-congested ASIC ports. Once ASIC port 6 becomes un-congested, the packets being held are released for transmission. For example, the packet 102 is held by the queue 96 until ASIC port 6 is no longer congested. Typically a port is no longer considered congested if the time-out period provided by the message 68 expires as measured by the message manager 66. Alternatively, if another message (not shown) is received from switching ASIC 42 that reports that ASIC port 6 is not longer congested, the packets destined for the port are released for selection by the link interface 94.

Figure 6:
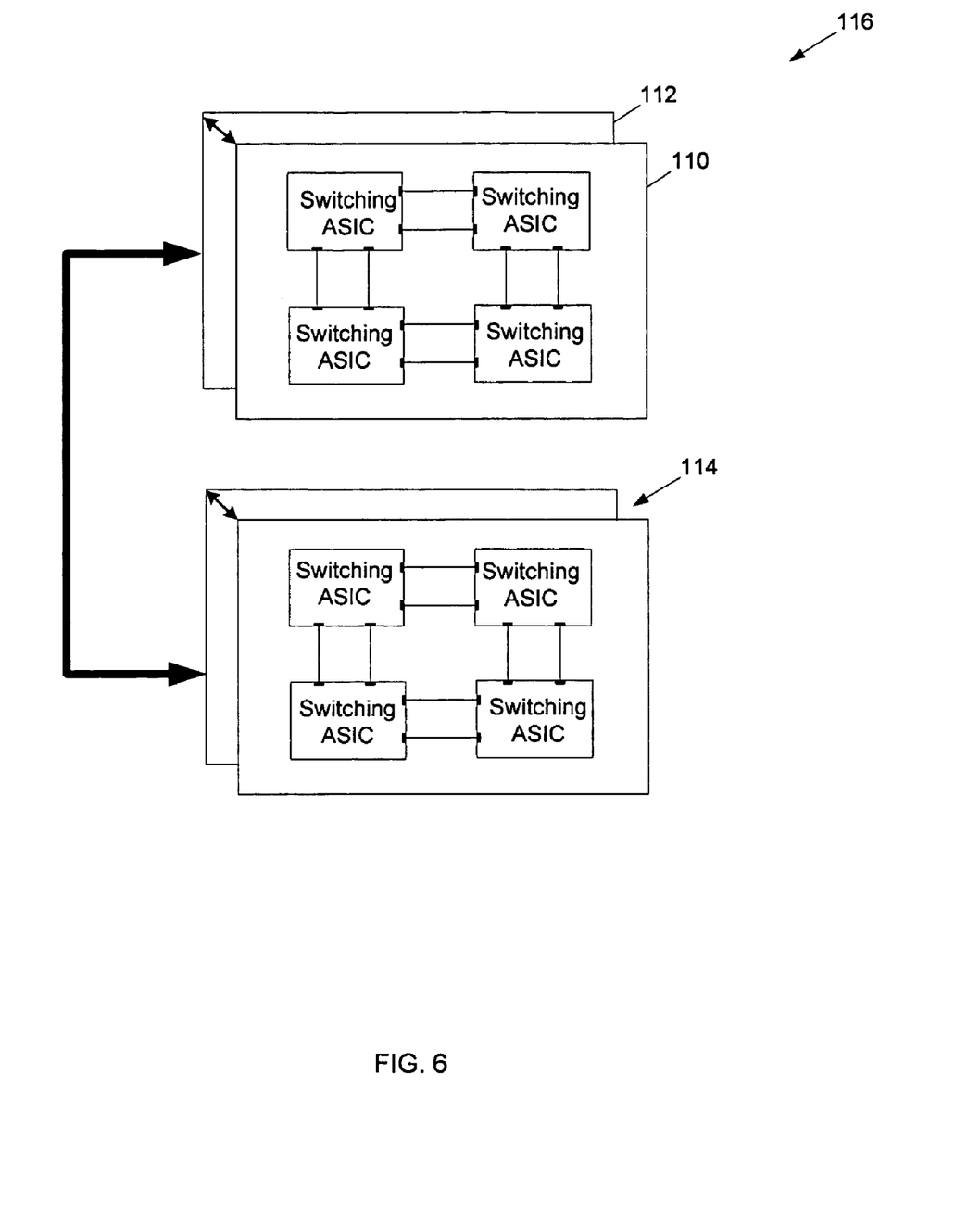
FIG. 6 is a block diagram depicting a multi-layered ASIC switching network.

Referring to FIG. 6, while the network switch 24 includes two switching ASIC 40, 42 for directing packets to the appropriate ASIC ports, in other arrangements more switching ASICs or systems of switching ASICs or other switching devices (e.g., switch fabrics, etc.) are included in a network switch or other packet-forwarding device. In general, by increasing the number of switching ASICs, the number of ports to support packet passing also increases so that e.g., twenty-four, forty-eight, or other number of ports can be provided by the network switch. In this example, an array of four switching ASICs is included in one switching layer 110 for use in a network switch. Additionally, the switching layer 110 is in communication with and stacked upon another switching layer 112 to provide an exemplary multi-layer design. Furthermore, another multi-layer stack 114 of switching layers provides additional ports and is in communication with the switching layers 110, 112 to produce a multi-layer switching ASIC system 116. Along with implementing multi-layer switching ASICs, or arrays of multi-layer switching ASICs, in some arrangements other two- and three-dimensional design layouts are used in network switch designs. For example, tree structures, modules, and other design techniques are used individually or in combination with the switching ASICs or switching ASIC arrays.

Similar to the two switching ASICs 40, 42, the multi-layer switching ASIC system 116 can experience congestion on one or more ports in an individual ASIC. However, instead of sending a single message, such as the message 68 to alert a second switching ASIC (e.g., switching ASIC 42) to the congestion, messages are broadcast throughout the multi-layer switching ASIC system 116 so that each individual ASIC is informed which particular ASIC port is congested. By providing a message throughout the system 116, each ASIC can track which ports are congested and correspondingly stop the flow of packets to the congested port or ports.

To provide a message to each switching ASIC in the system 116, a switching ASIC that includes a congested port directs a message to each switching ASIC in the system. In other arrangements, the switching ASIC inflicted with one or more congested ports sends one or a limited number of messages to nearby switching ASICs that are then forwarded to the other the switching ASICs in the system 116 so that each switching ASIC can track the congestion present in the system 116.

In some arrangements, rather than sending a message or a group of messages to be received by all of the switching ASICs, the switching ASIC inflicted with a congested port directs a message or messages to other switching ASICs included in the system 116 that are sending packets to the congested port. To direct such messages, the inflicted switching ASIC collects from the congested port data that identifies the switching ASICs sending packets to the congested port.

Figure 7A:
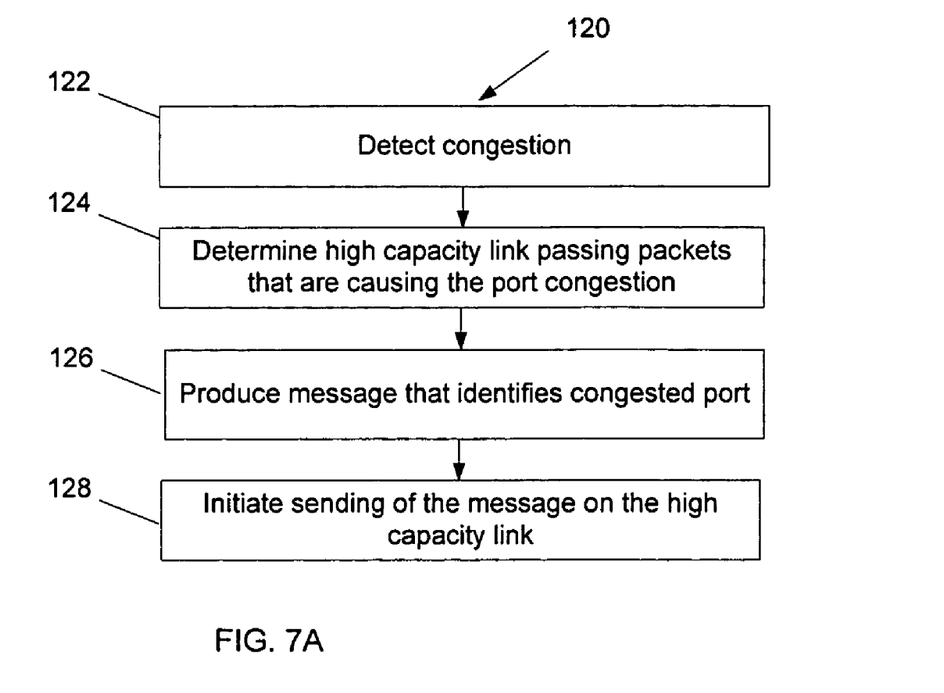
FIGS. 7A-B are flow charts of portions of a message manager.

Referring to FIG. 7A a portion of a message manager 120, such as the message manager 64 hardware-implemented in the switching ASIC 42, includes detecting 122 if a port included in the switching ASIC is congested. In some arrangements a port controller such as the port controller 62 monitors the switching ASIC ports for congestion and signals the message manager 64 of congested ports. After port congestion is detected, the message manager 120 determines 124 which high capacity link or links is passing packets to the switching ASIC that is causing the port congestion. The message manager 120 also produces 126 a message such as an Ethernet pause frame that stores data that identifies the congested port. Furthermore, in some arrangements the message also includes data that identifies the switching ASIC(s) and associated ASIC port(s) that are sending the packets causing the port congestion. After producing the message, the message manager 120 initiates 128 sending of the message on the high capacity link that is passing the packets causing the port congestion.

Figure 7B:
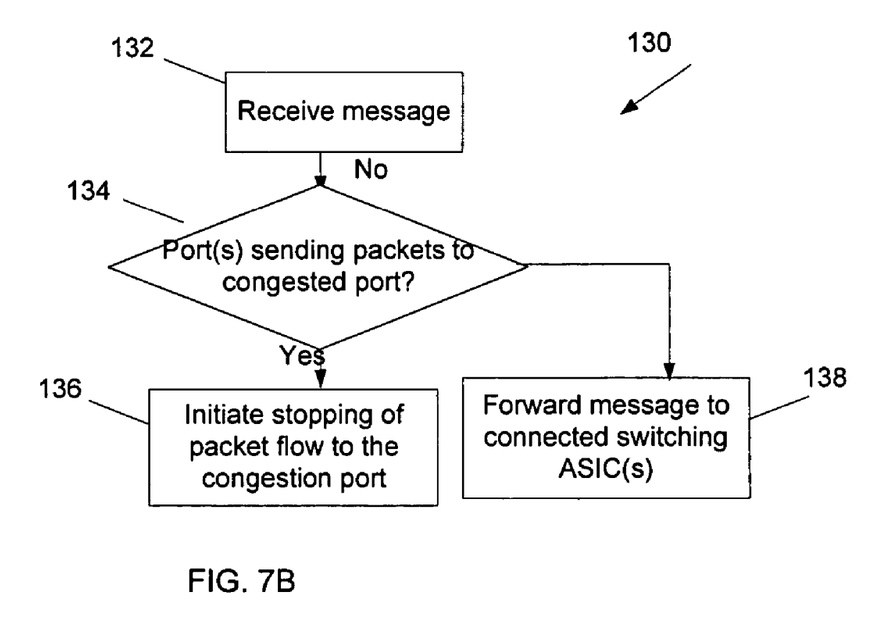

Referring to FIG. 7B another portion of a message manager 130, such as the message manager 66 hardware-implemented in switching ASIC 40, includes receiving 132 a message (e.g., an Ethernet pause frame) from a high capacity link connected to a switching ASIC where the message manager is executed. After the message is received, the message manager 130 determines 134 if any of the ASIC ports included in the switching ASIC where the message manager is executed are sending packets to the congested ASIC port identified in the message. If one or more of the ASIC ports are sending packets to the congested ASIC ports, the message manager initiates 136 stopping the transmission of the packets to the congested ASIC port for a time period also provided by the message. After the time period expires, packet transmission typically resumes, although in some arrangements the stopped packet transmission is released based on another message being received by the message manager 130. If no ASIC ports are causing the port congestion, as identified by the received message, the message manager 130 forwards 138 the message to one or more other switching ASICs in communication with the switching ASIC where the message manager 130 is executed.

Figure 8:
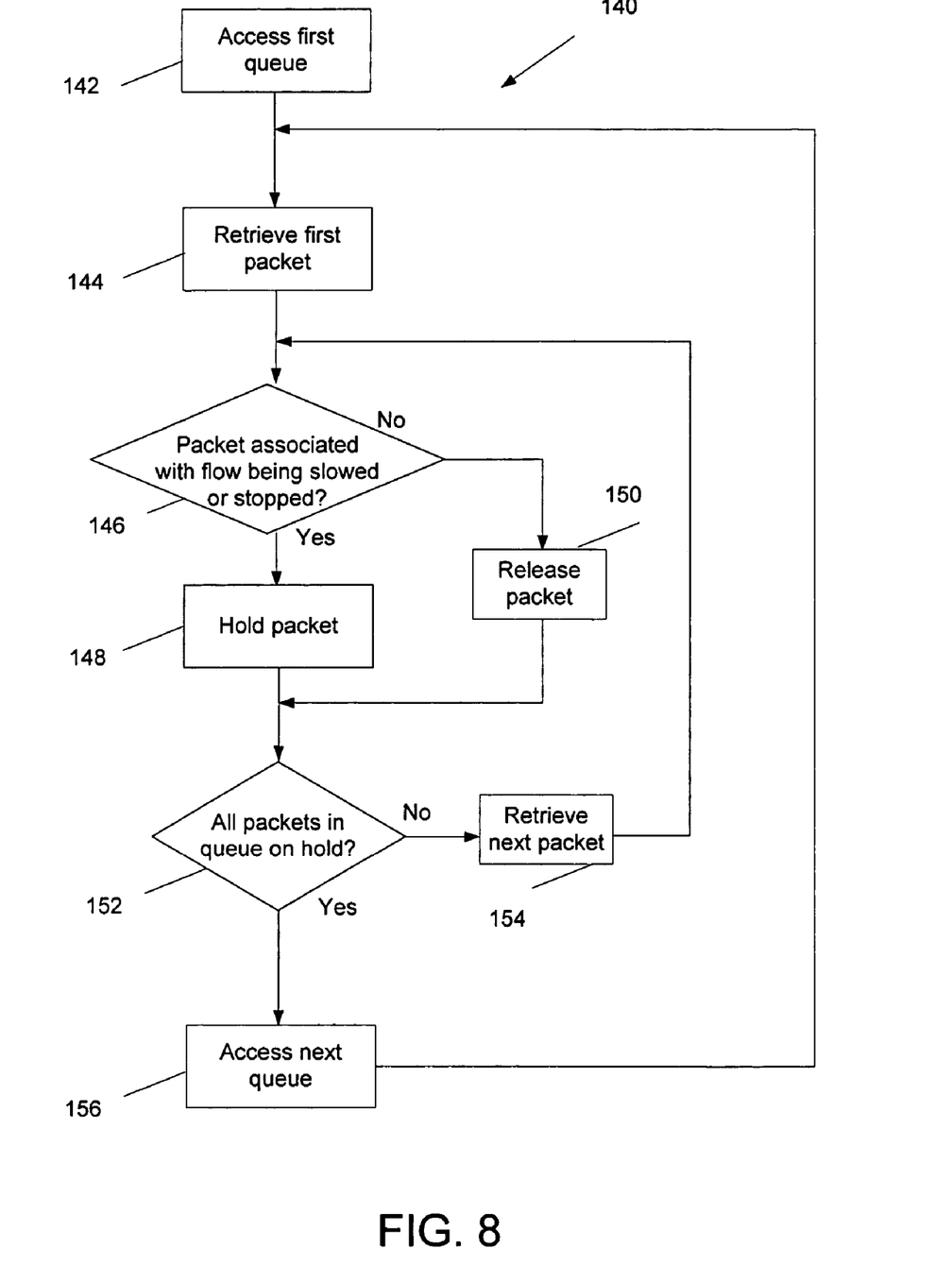
FIG. 8 is a flow chart of a portion of a link controller.

Referring to FIG. 8, a portion of a link controller 140, such as the link controller 72 hardware-implemented in the switching ASIC 40, includes accessing 142 a first queue included in a link port such as link port 70. For example, the link controller accesses the queue 96 included in the link port 70. After the first queue is accessed, the link controller 140 retrieves 144 the first packet in the first queue that is selectable for transmission over a high capacity link in communication with the link port where the queue resides. Once retrieved, the link controller 140 determines 146 if the packet is associated with a packet flow being slowed or stopped. For example, if the packet is intended for a congested port, or intended for an ASIC that currently lacks sufficient memory, or based on the packet type (e.g., a low priority packet), the packet is associated with a flow being slowed or stopped. If the retrieved packet is associated with a packet flow being slowed or stopped, link controller 140 initiates holding 148 of the packet in the queue and not allowing the packet to be transmitted until a time out period has expired or until releasing information is provided to the link controller. If the packet is not associated with a packet flow being slowed or stopped, the link controller releases 150 the packet for transmission. Once the packet is being held or is released for transmission, the link controller 140 determines 152 if all the packets in the queue are currently being held. If all of the packets in the queue are not being held, the link controller 140 retrieves 154 the next packet in the queue and returns to determine if this packet is associated with a packet flow being slowed or stopped. If all the packets in the queue are being held from transmission, the line monitor 140 accesses 156 the next queue in the link port and returns to retrieve the first packet in this queue. In some arrangements if each queue has been accessed, the link controller 140 returns to access the first queue and cycles through each queue again in a round-robin fashion.

Particular embodiments have been described, however other embodiments are within the scope of the following claims. For example, the operations of the message manager 120 can be performed in a different order and still achieve desirable results.

What is claimed is:

1. A method comprising:
receiving a plurality of packets at a plurality of first locations in a first stacked switching device operatively coupled to a second stacked switching device, each packet identifying a corresponding destination location where each packet is to be delivered, each stacked switching device including a plurality of switching devices stacked on top of each other;
queuing the received plurality of packets in at least one queue;
receiving a message on the first stacked switching device from the second stacked switching device, the message identifying a congested second location in the second stacked switching device, the message transmitted by the second stacked switching device upon a determination that the second location is congested;
determining that a destination location of a first packet of the received plurality of packets is the congested second location; and
holding the first packet in the at least one queue.

2. The method of claim 1 wherein the message comprises a frame including an identifier identifying the congested second location.

3. The method of claim 1, wherein slowing packet transmission comprises stopping packet transmission from the first stacked switching device to the congested second location in the stacked second switching device.

4. The method of claim 1, wherein a packet for packet transmission to a destination second location is queued at a sending first location.

5. The method of claim 4, further comprising, in response to receiving the message slowing transmission of the packet from the first location, upon determining that the destination second location is the congested second location.

6. The method of claim 2, wherein the frame is a PAUSE frame.

7. The method of claim 6, wherein the PAUSE frame temporarily permits stopping packet transmission.

8. The method of claim 2, wherein the frame comprises a first segment identifying the second stacked switching device.

9. The method of claim 2, wherein the frame comprises a second segment identifying the congested second location.

10. The method of claim 1, further comprising:
determining that the congested second location is no longer congested; and
transmitting the first packet in the at least one queue to the destination location of the first packet.

11. The computer program product of claim 10, wherein the PAUSE frame temporarily permits stopping packet transmission.

12. A method comprising:
receiving a plurality of packets on a first stacked switching device from a second stacked switching device, the plurality of packets for transmitting to a plurality of first locations in the first stacked switching device, each stacked switching device including a plurality of switching devices stacked on top of each other;
determining that a first location in a first switching device included in the first stacked switching device is congested; and
in response to the determining, transmitting a message to the second stacked switching device identifying the congested location to temporarily stop packet transmission, the message comprising a frame including a plurality of segments, a first segment of the plurality of segments identifying the congested location and a second segment of the plurality of segments identifying the first switching device.

13. A memory, tangibly encoded instructions executable by a processor to perform operations comprising:
receiving a plurality of packets at a plurality of first locations in a first stacked switching device operatively coupled to a second stacked switching device, each packet identifying a corresponding destination location where each packet is to be delivered, each stacked switching device including a plurality of switching devices
queuing the received plurality of packets in at least one queue;
receiving a message on the first stacked switching device from the second stacked switching device, the message identifying a congested second location in the second stacked switching device, the message transmitted by the second stacked switching device upon a determination that the second location is congested;
determining that a destination location of a first packet of the received plurality of packets is the congested second location; and
holding the first packet in the at least one queue.

14. The memory of claim 13,
wherein the message comprises a frame including an identifier identifying the congested second location.

15. The computer program product of claim 13, wherein slowing packet transmission comprises stopping packet transmission from the first stacked switching device to the congested second location in the second stacked switching device.

16. The computer program product of claim 13, wherein a packet for packet transmission to a destination second location is queued at a sending first location.

17. The computer program product of claim 13, wherein the frame comprises a first segment identifying the second stacked switching device.

18. The computer program product of claim 13, wherein the frame comprises a second segment identifying the congested second location.

19. The computer program product of claim 13, the operations further comprising:
determining that the congested second location is no longer congested; and
transmitting the first packet in the at least one queue to the destination location of the first packet.

20. A memory, tangibly encoded instructions executable by a processor to perform operations comprising:
receiving a plurality of packets on a first stacked switching device from a second stacked switching device, the plurality of packets for transmitting to a plurality of first locations in the first stacked switching device, each stacked switching device including a plurality of switching devices stacked on top of each other;
determining that a first location in a first switching device included in the first stacked switching device is congested; and
in response to the determining, transmitting a message to the second stacked switching device identifying the congested location to temporarily stop packet transmission, the message comprising a frame including a plurality of segments, a first segment of the plurality of segments identifying the congested location and a second segment of the plurality of segments identifying the first switching device.

21. A memory of claim 20, the operations further comprising:
transmitting the message from the second stacked switching device to a third stacked switching device.

22. A memory of claim 20 wherein the first switching device includes an application-specific integrated circuit.

23. A system comprising:
a first stacked switching device including a plurality of switching devices, each switching device stacked upon another switching device, each switching device including a plurality of first locations configured to transmit and receive packets; and
a second stacked switching device, operatively coupled to the first stacked switching device, the second stacked switching device including a plurality of switching devices, each switching device stacked upon another switching device, each switching device including a plurality of second locations, the second stacked switching device configured to perform operations comprising,
transmitting a plurality of packets from one or more second locations at the second stacked switching device to the first stacked switching device, each packet identifying a corresponding destination location where each packet is to be delivered,
receiving a message from the first stacked switching device to regulate packet flow, the message identifying a congested first location in the first stacked switching device, the message transmitted by the second stacked switching device upon a determination that the second location is congested, queuing the received plurality of packets in at least one queue, determining that a destination location of a first packet of the received plurality of packets is the congested second location, and holding the first packet in the at least one queue.

24. The system of claim 23 wherein the first stacked switching device is further configured to perform operations comprising:

receiving the plurality of packets from the second stacked switching device;

determining that a first location in a first switching device included in the first stacked switching device is congested; and in response to the determining, transmitting a message to the second stacked switching device to temporarily stop packet transmission, the message identifying the congested location, the message comprising a frame including a plurality of segments, a first segment of the plurality of segments identifying the congested location and a second segment of the plurality of segments identifying the first switching device.

* * * * *